E. A. BURNES.
UNIVERSAL JOINT.
APPLICATION FILED AUG. 21, 1920.

1,390,668.

Patented Sept. 13, 1921.

INVENTOR.
Edward A. Burnes.
BY F. R. Cornwall
ATTORNEY.

UNITED STATES PATENT OFFICE.

EDWARD A. BURNES, OF ST. LOUIS, MISSOURI.

UNIVERSAL JOINT.

1,390,668.  Specification of Letters Patent.  Patented Sept. 13, 1921.

Application filed August 21, 1920. Serial No. 405,015.

*To all whom it may concern:*

Be it known that I, EDWARD A. BURNES, a citizen of the United States, residing at St. Louis, Missouri, have invented a certain new and useful Improvement in Universal Joints, of which the following is a full, clear, and exact description, such as will enable others skilled in the art to which it appertains to make and use the same, reference being had to the accompanying drawings, forming part of this specification.

My invention has relation to improvements in shaft couplings of the type commonly called universal joints, and consists in the novel features of construction more fully set forth in the specification and pointed out in the claims.

The object of the present invention is to provide a shaft coupling that is adapted to couple shafts that are angularly disposed so that the motion of the driving shaft will be communicated to the driven shaft with a minimum loss of power.

A further object is to provide a shaft coupling of the type referred to above that is certain in its operation and will possess a large degree of flexibility together with an exceeding smoothness of action.

A further object is to provide a shaft coupling that is self-contained, comparatively compact, one that is simple, and that may be cheaply manufactured.

Further and other advantages will be better apparent from a detailed description of the invention in connection with the accompanying drawings, in which—

Figure 1:
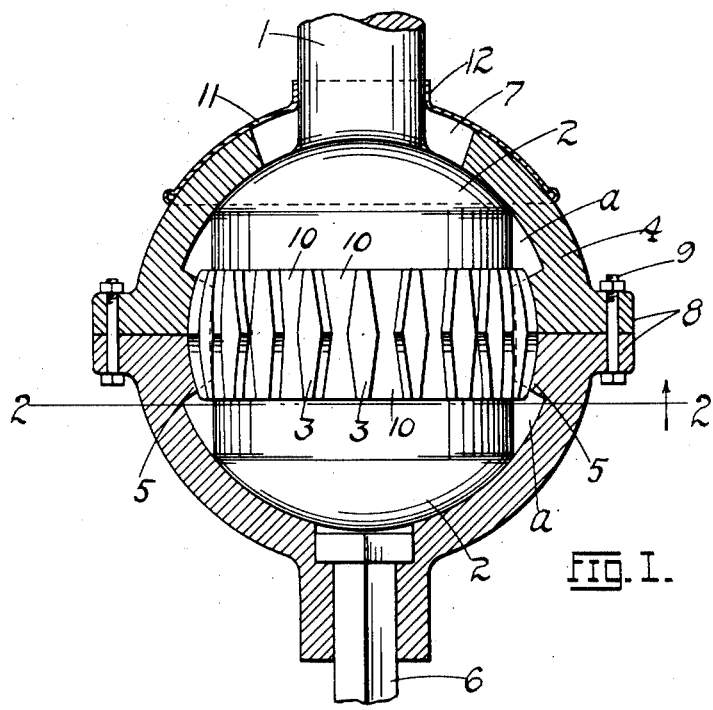
Figure 1 is a longitudinal middle section through the outer member of the coupling, the inner member remaining in elevation.
Figure 2:
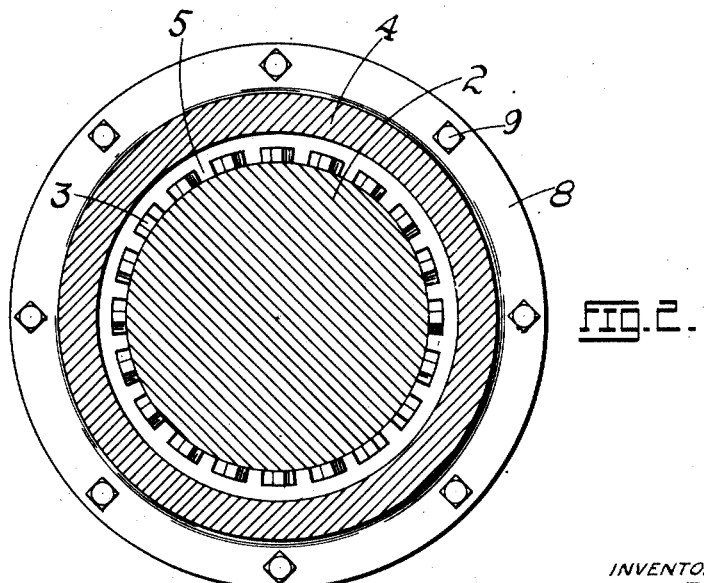
Fig. 2 is a transverse section on the line 2—2 of Fig. 1.

Referring now to the drawings, 1 represents the driving shaft carrying a ball 2 on its coupled extremity, which ball is provided with a series of diamond-shaped teeth 3, the latter being annularly disposed and of spherical contour. The ball 2 is arranged to have bearing in a hollow spherical member 4, the member 4 being provided with plain teeth 5 disposed around its inner surface, the teeth 5 being adapted to coöperate with the diamond-shaped teeth 3.

Opposite the driving shaft 1 the member 4 is provided with a polygonal opening for the reception of the extremity 6 of the driven shaft. The driven shaft 6 is provided with a square end in the present instance; however, this shape may be departed from as the circumstances dictate. Where the shaft 1 enters the member 4, said member is provided with an opening 7 sufficiently large to permit of considerable angular movement by the driving shaft 1.

In order that the coupling may be readily assembled, the outer spherical member 4 is made in halves, each half being provided with annular flanges 8 which are secured together by means of bolts 9. Obviously, if the teeth 3 on the member 2 and the teeth 5 on the member 4 were snugly meshed, there would be no play to permit of the angular movement of the driving shaft 1. However, in order that the shaft 1 may be capable of such angular movement, the teeth 3 are made diamond-shaped which leaves outwardly flaring recesses 10 between said teeth, in which recesses the teeth 5 are free to rock depending upon the movement of the driving shaft 1. The side edges of adjacent teeth 3 are substantially the width of the teeth 5 which, notwithstanding the flare of the recesses between the teeth, will insure a positive driving action through the teeth with no lost motion. It may be readily seen that both the teeth 3 and 5 must needs be of spherical contour because of the relative movement between the members 2 and 4.

In order that the ball 2 may have freedom of movement within the member 4 within certain limits, said ball is turned down to the shape of a cylinder a short distance on both sides of the teeth 3, thereby leaving spaces *a* wherein the ball 2 is free to move.

In order to prevent dust and grit from getting into the hollow member 4 through the opening 7, a dust guard 11 having a neck 12 is passed over the shaft 1 and being of the same contour as the member 4 will hug said member and effectively close the opening 7. However, the dust guard 11 is free to slide over the surface of the member 4 in the movements of the driving shaft 1.

Obviously the present invention is susceptible of modifications without departing from the spirit of the same.

Having described my invention, I claim:

1. A universal joint comprising a hollow socket member, a series of internal gear teeth projecting from the inner surface of said member, a ball member having diametrically opposite plain spherical bearings against said socket member and having a series of external gear teeth projecting from its surfaces in a zone positioned intermediate said bearings and transversely of the axis connecting them.

2. A universal joint comprising a hollow spherical socket member having an equatorial zone of inwardly projecting teeth and a ball member flattened transversely of the joint axis to provide a cylinder of less diameter than the member, having its spherical surfaces journaled in said socket member and having a zone of external teeth on its cylindrical surface.

In testimony whereof I hereunto affix my signature this 13th day of August, 1920.

EDWARD A. BURNES.